(12) United States Patent
Lemkin et al.

(10) Patent No.: US 7,051,590 B1
(45) Date of Patent: May 30, 2006

(54) STRUCTURE FOR ATTENUATION OR CANCELLATION OF QUADRATURE ERROR

(75) Inventors: Mark A. Lemkin, El Cerrito, CA (US); William A. Clark, Fremont, CA (US); Thor N. Juneau, Berkeley, CA (US); Allen W. Roessig, Fremont, CA (US)

(73) Assignee: Analog Devices IMI, Inc., Berkeley, CA (US)

( * ) Notice: Subject to any disclaimer, the term of this patent is extended or adjusted under 35 U.S.C. 154(b) by 0 days.

(21) Appl. No.: 09/593,593

(22) Filed: Jun. 13, 2000

Related U.S. Application Data

(60) Provisional application No. 60/139,352, filed on Jun. 15, 1999.

(51) Int. Cl.
*G01P 9/04* (2006.01)

(52) U.S. Cl. .............................. 73/504.04; 73/504.12; 73/504.14

(58) Field of Classification Search ............. 73/504.04, 73/504.02, 504.03, 504.12, 504.13, 504.14, 73/504.15, 504.16, 514.32
See application file for complete search history.

(56) References Cited

U.S. PATENT DOCUMENTS

| | | |
|---|---|---|
| 4,061,043 A | 12/1977 | Stiles |
| 4,511,848 A | 4/1985 | Watson |
| RE32,931 E | 5/1989 | Staudte |
| RE33,479 E | 12/1990 | Juptner et al. |
| 5,016,072 A | 5/1991 | Greiff |
| 5,025,346 A | 6/1991 | Tang et al. |
| 5,203,208 A | 4/1993 | Bernstein |
| 5,349,855 A | 9/1994 | Bernstein et al. |
| 5,383,362 A | 1/1995 | Putty et al. |
| 5,392,650 A | 2/1995 | O'Brien et al. |
| 5,419,194 A * | 5/1995 | Varnham et al. ......... 73/504.13 |
| 5,450,751 A | 9/1995 | Putty et al. |
| 5,481,914 A * | 1/1996 | Ward ....................... 73/504.16 |
| 5,488,863 A | 2/1996 | Mochida et al. |
| 5,495,761 A | 3/1996 | Diem et al. |
| 5,505,084 A | 4/1996 | Greiff et al. |
| 5,505,085 A | 4/1996 | Kasanami et al. |
| 5,530,342 A | 6/1996 | Murphy |
| 5,563,343 A | 10/1996 | Shaw et al. |
| 5,569,852 A | 10/1996 | Marek et al. |

(Continued)

OTHER PUBLICATIONS

Clark, W.A., Micromachined Vibratory Rate Gyroscopes, Doctoral Dissertation, University of California, 1997.

(Continued)

*Primary Examiner*—Helen Kwok
(74) *Attorney, Agent, or Firm*—Vierra Magen Marcus & DiNiro LLP

(57) ABSTRACT

A movable microstructure includes a first finger set comprising two or more first fingers affixed to a substrate and extending substantially parallel to a defined displacement axis towards a proof-mass. The movable microstructure further includes a second finger set comprising at least one second finger, each member of the second finger set extending substantially parallel to the displacement axis from the proof-mass, terminating between two first fingers. Each second finger is substantially closer to one of the two first fingers between which it terminates. The first finger set, in conjunction with the second finger set, form two terminals of a capacitor. An electrical circuit is included that provides a voltage across the capacitor to generate a position-dependent force, the position-dependent force having a component along an axis substantially orthogonal to the displacement axis, the magnitude of the position-dependent force varying in proportion to displacement along the displacement axis.

20 Claims, 7 Drawing Sheets

U.S. PATENT DOCUMENTS

| | | | |
|---|---|---|---|
| 5,597,955 | A | 1/1997 | Leger et al. |
| 5,600,064 | A | 2/1997 | Ward |
| 5,604,309 | A | 2/1997 | Ward |
| 5,608,351 | A | 3/1997 | Ward |
| 5,616,864 | A | 4/1997 | Johnson et al. |
| 5,621,171 | A | 4/1997 | Fell |
| 5,631,422 | A * | 5/1997 | Sulzberger et al. ...... 73/514.32 |
| 5,635,638 | A | 6/1997 | Geen |
| 5,635,639 | A | 6/1997 | Greiff et al. |
| 5,635,640 | A | 6/1997 | Geen |
| 5,635,739 | A | 6/1997 | Grieff et al. |
| 5,635,787 | A | 6/1997 | Mori et al. |
| 5,652,374 | A | 7/1997 | Chia et al. |
| 5,656,777 | A | 8/1997 | Petri et al. |
| 5,672,949 | A | 9/1997 | Ward |
| 5,696,322 | A | 12/1997 | Mori et al. |
| 5,696,420 | A | 12/1997 | Inanaga et al. |
| 5,698,784 | A | 12/1997 | Hotelling et al. |
| 5,739,410 | A | 4/1998 | Fell |
| 5,992,233 | A * | 11/1999 | Clark ....................... 73/514.16 |
| 6,122,964 | A * | 9/2000 | Mohaupt et al. ......... 73/514.32 |
| 6,151,966 | A * | 11/2000 | Sakai et al. .............. 73/514.32 |
| 6,230,563 | B1 * | 5/2001 | Clark et al. .............. 73/504.04 |
| 6,250,156 | B1 * | 6/2001 | Seshia et al. ............ 73/504.12 |
| 6,253,612 | B1 * | 7/2001 | Lemkin et al. .......... 73/504.02 |
| 6,296,779 | B1 * | 10/2001 | Clark et al. .............. 73/504.16 |
| 6,450,031 | B1 * | 9/2002 | Sakai et al. .............. 73/514.16 |

OTHER PUBLICATIONS

Juneau, T.N., Micromachined Dual Input Axis Rate Gyroscope, Doctoral Dissertation, University of California, 1997.

Roessig, T.A. W., Integrated MEMS Tuning Fork Oscillators for Sensor Applications, Doctoral Dissertation, Univeristy of California, 1998.

Lemkin, M.A., Micro Accelerometer Design with Digital Feedback Control, Doctoral Dissertation, University of California, 1997.

Clark, W.A., Howe, R.T., Horowitz, R., "Surface micromachined z-axis vibratory rate gyroscope," *IEEE Solid-State Sensor and Actuator Workshop*, Hilton Head, SC, pp. 283-287, Jun. 1996.

Geiger, et al., "New Designs of Micromachined Vibrating Rate Gyroscopes with Decoupled Oscillation Modes," *Transducers 97*, Chicago, IL pp. 1129-1132, Jun. 1997.

* cited by examiner

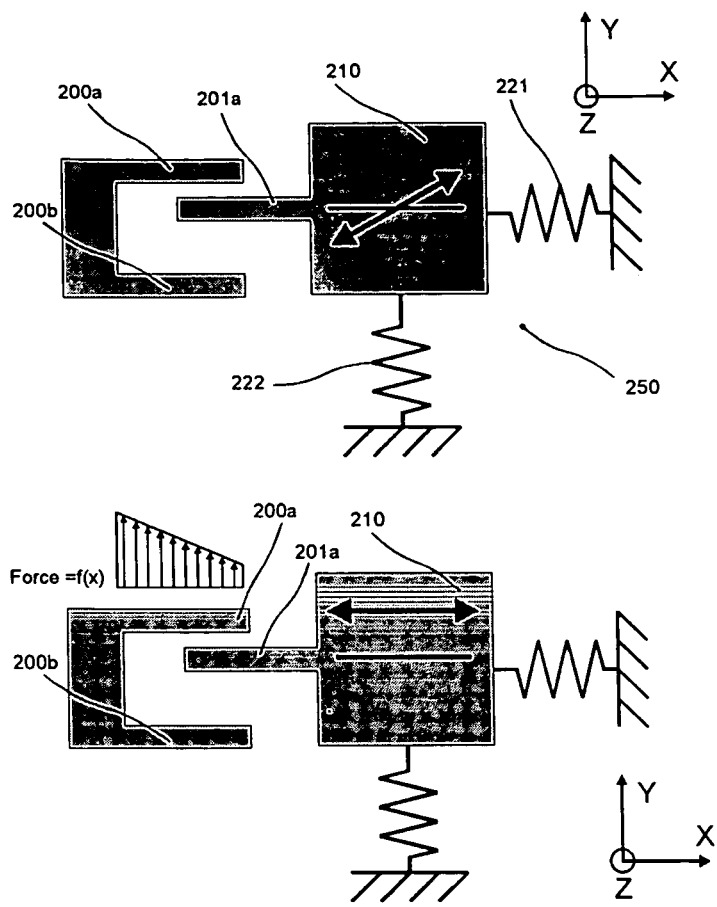
Figure 5: (A) top, (B) bottom.
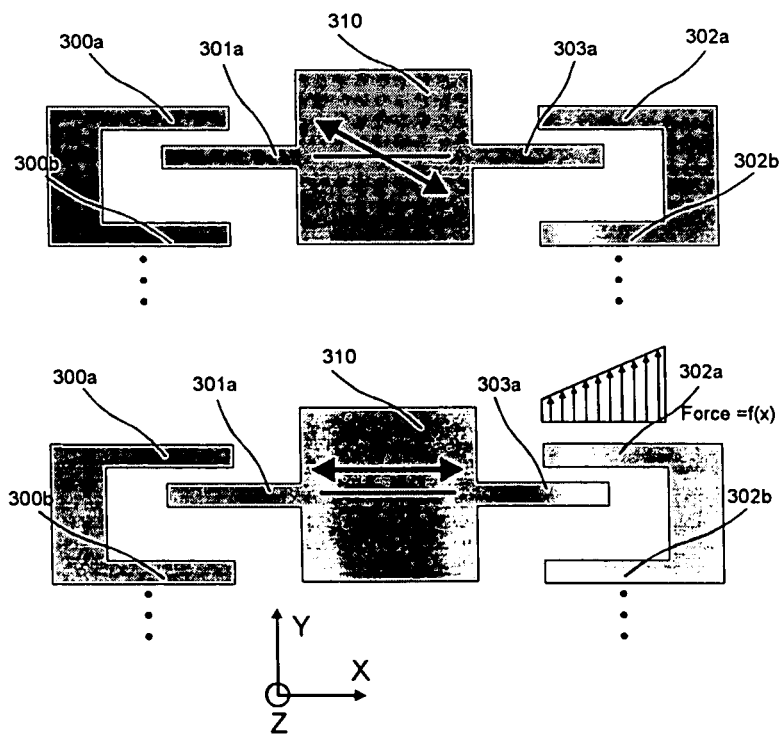
Figure 6: (A) top, (B) bottom.

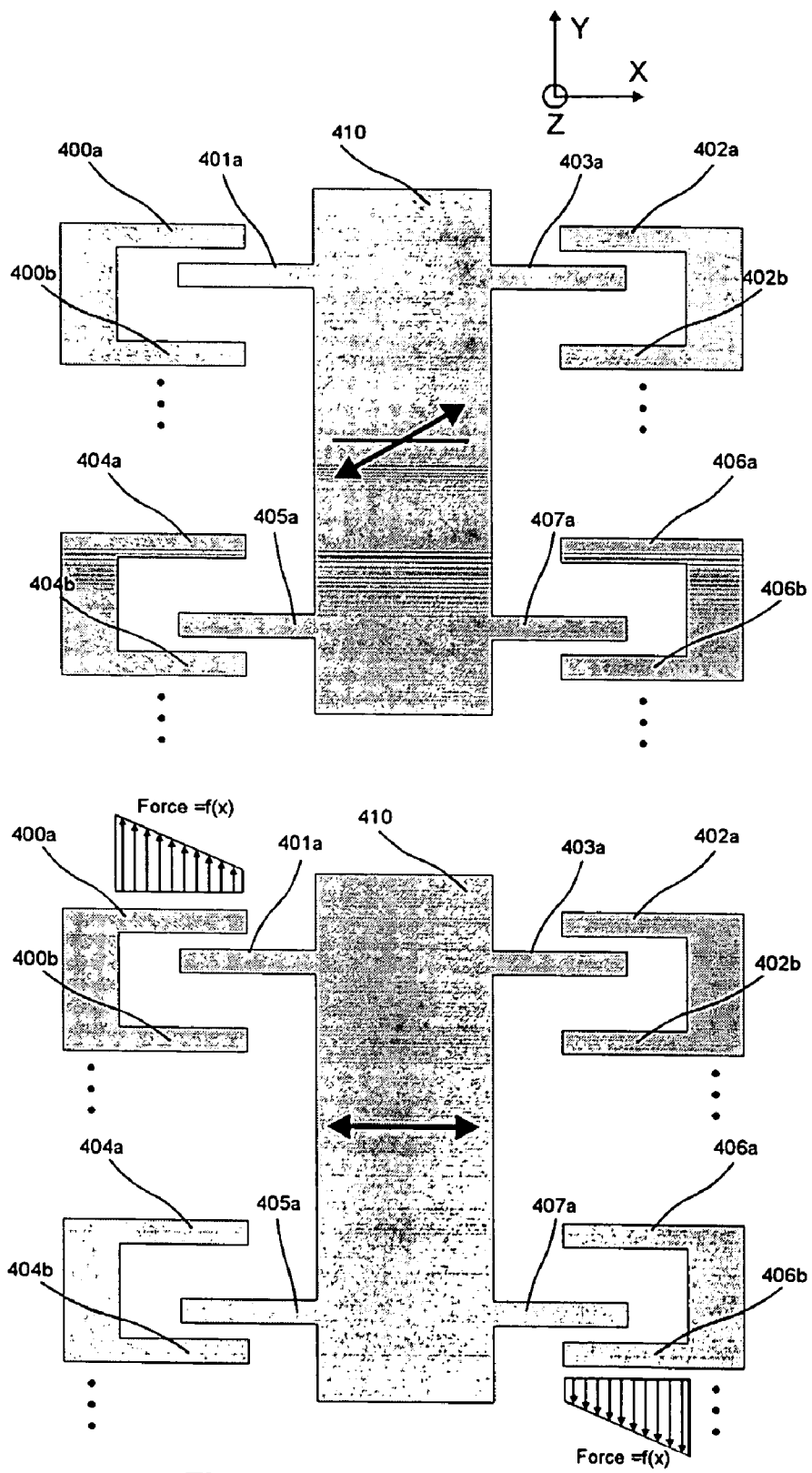
Figure 7: (A) top, (B) bottom.

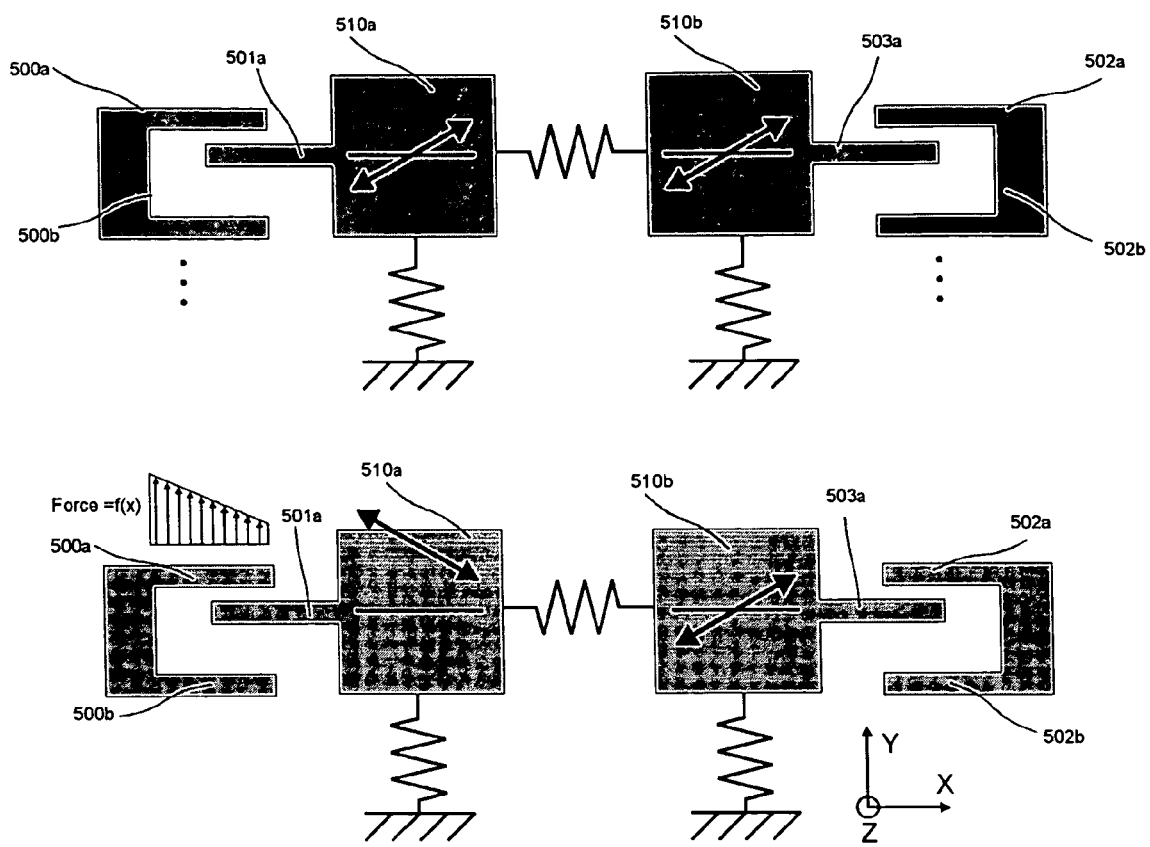
Figure 8: (A) top, (B) bottom.

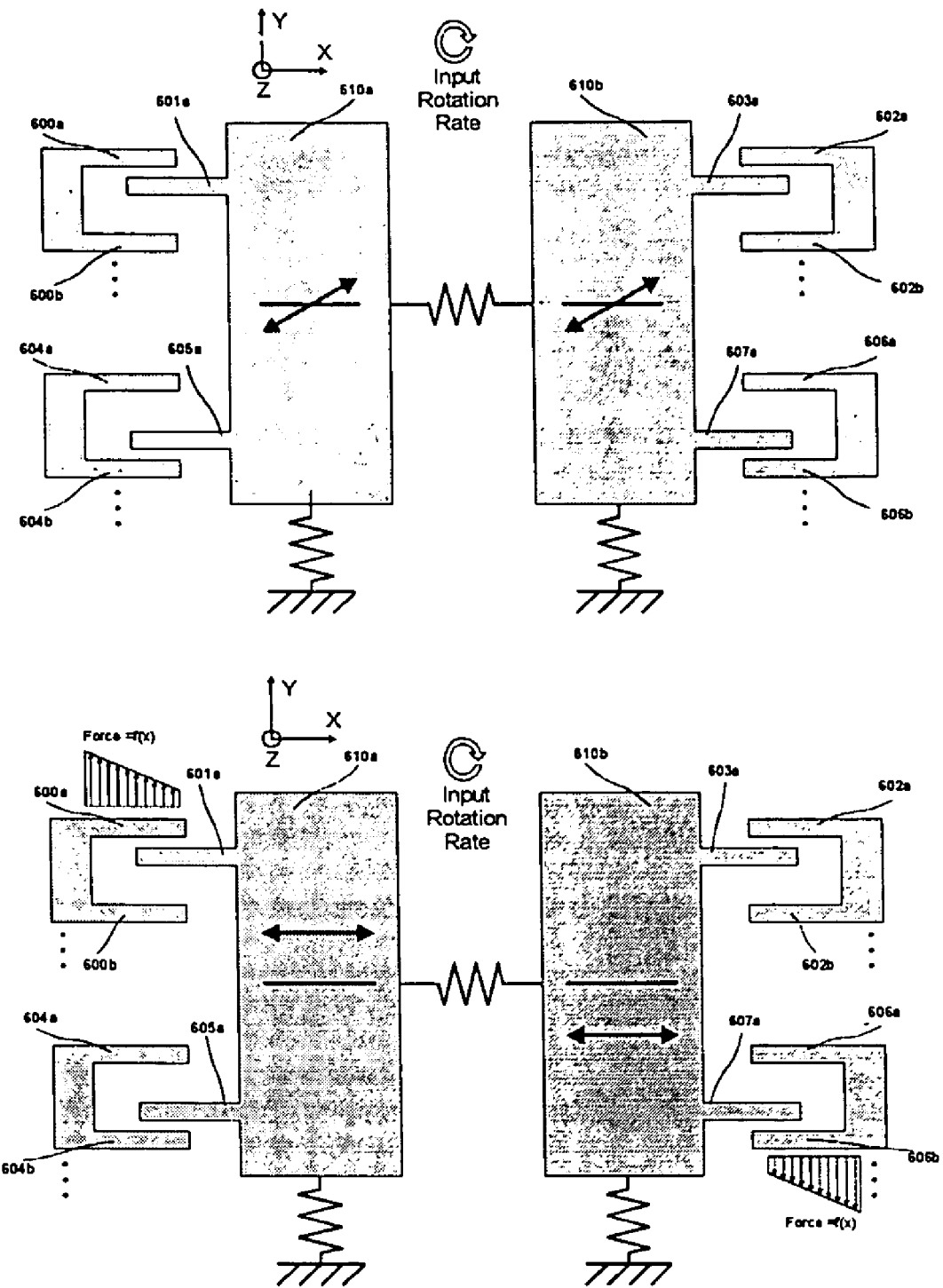
Figure 9: (A) top, (B) bottom.

STRUCTURE FOR ATTENUATION OR CANCELLATION OF QUADRATURE ERROR

CROSS-REFERENCE TO RELATED APPLICATION

This application claims priority to Provisional Application Ser. No. 60/139,352 filed Jun. 15, 1999 entitled "VIBRATORY RATE GYROSCOPE WITH QUADRATURE-ERROR CORRECTION CAPABILITY."

IDENTIFICATION OF GOVERNMENT INTEREST

This invention was made with Government support under F49620-98-C-0082 awarded by the Air Force Office of Scientific Research. The Government has certain rights in the invention.

BACKGROUND OF THE INVENTION

1. Field of the Invention

This invention relates generally to moving structures and more particularly, to vibratory rate gyroscopes. This invention may be used to reduce error caused by imperfections in implementation of such structures.

2. Description of the Related Art

Rate gyroscopes are sensors that measure rotation rate. Rate gyroscopes have uses in many commercial and military applications including, but not limited to, inertial navigation, vehicular skid control, and platform stabilization.

A vibratory rate gyroscope is a sensor that responds to a rotation rate by generating and measuring Coriolis acceleration. Coriolis acceleration is generated by an object, such as a proof-mass, that has some velocity relative to a rotating reference frame. In vibratory rate gyroscopes, one or more proof-masses are often suspended from flexures and made to oscillate thus providing a velocity necessary to generate Coriolis acceleration. Measurement of the resulting Coriolis acceleration can then yield an estimate of the rotation rate of the sensor.

An idealized version of a single-mass sensor is shown in FIG. 1. In this figure a three-dimensional, mutually orthogonal coordinate system is shown for reference. The axes are arbitrarily labeled "X", "Y", and "Z" to enable description of background material as well as the invention. Oscillation that is largely coincident with the X-axis is often referred to as the drive-mode or driven-mode. Coriolis acceleration is generated perpendicular to the drive-mode along the sense-mode, which lies largely along the Y-axis. The Coriolis acceleration generated by the system shown in FIG. 1 is given by:

$$a_{Coriolis} = 2\Omega_z D_x \omega_x \cos(\omega_x t) \quad \text{Equation 1}$$

where $a_{Coriolis}$ is the Coriolis acceleration generated along the sense-mode, $\Omega_z$ is the rotation rate to be measured about the Z-axis, and $\omega_x$ and $D_x$ are the frequency and magnitude of drive-mode oscillation, respectively. The Coriolis acceleration causes an oscillatory displacement of the sensor along the sense-mode with magnitude proportional to the generated Coriolis acceleration. Ideally, the drive-mode is coincident with the forcing means used to sustain oscillation (located along the X-axis or drive-axis), and the sense-mode is coincident with the sensing means used to detect displacements due to Coriolis acceleration (located along the Y-axis or sense-axis).

The simplified schematic of FIG. 1 shows proof-mass 52, attached to substrate 51 via a compliant suspension that may be modeled by two springs 50a, and 50b. Typically the compliant suspension is designed such that the suspension may be modeled by an orthogonal decomposition into two springs: spring 50b lying along the sense-mode and spring 50a lying along the drive-mode. Mathematically this translates into a goal of being able to decompose the suspension into a diagonal spring matrix when an orthogonal coordinate system comprising the sense-axis and the drive-axis is chosen. The design and fabrication of the proof-mass and the suspension will dictate the actual orientation of the drive- and sense-modes with respect to the driving and sensing axes. Often, the suspension may have small, off-diagonal spring-matrix components due to, for example, processing imperfections during a reactive-ion-etching step, or misalignment of the drive and sense-axes to their corresponding modes.

FIG. 2 shows a simplified schematic of a dual-mass gyroscope. In a dual-mass gyroscope, a differential oscillation of proof-masses 62a and 62b along the drive-mode lead to a differential Coriolis-acceleration induced oscillation along the sense-mode. The suspension of a dual mass gyroscope may be modeled by springs 60a, 60b, and 60c. Often the suspension may be further decomposed to have additional springs (not shown) that provide restoration of common-mode deflections along the X-axis. The operation of dual-mass gyroscopes is well known by those skilled in the art, with example dual-mass gyroscopes described in Clark et al. U.S. patent application Ser. 09/321,972 filed May 28, 1999; Geen, U.S. Pat. No. 5,635,640, Issued Jun. 3, 1997; Geen, U.S. Pat. No. 5,635,638, Issued Jun. 3, 1997; Ward et al., U.S. Pat. No. 5,747,961, Issued May 5, 1998; Lee et al., U.S. Pat. No. 5,757,103, Issued May 26, 1998.

It is important to understand that the Coriolis acceleration signal along the sense-axis is in phase with velocity of the drive-mode, which is 90 degrees out-of-phase with proof-mass displacement along the drive-mode. While the Coriolis acceleration is 90 degrees out-of-phase with the proof-mass displacement along the drive-mode, displacements along the sense-mode due to Coriolis acceleration may have a different phase relationship to the proof-mass displacement along the drive-mode depending on several factors including: the relative values of drive-mode oscillation frequency to sense-mode resonant frequency, and the quality factor of the sense-mode.

Forces are often applied to vibratory-rate gyroscopes to generate or sustain proof-mass oscillation. Forces may be applied to the gyroscope using variable air-gap capacitors formed between one or more plates or conductive nodes attached to the proof-mass and one or more plates or conductive nodes attached to the substrate. Note that electrostatic forces result between charged capacitor plates. The magnitude and direction of the force is given by the gradient of the potential energy function for the capacitor as shown below.

$$\vec{F} = -\nabla U = -\nabla \left[ \frac{Q^2}{2C(x, y, z)} \right] \quad \text{Equation 2}$$

As an example, an appropriate oscillation in the gyroscope may be generated using a force along a single axis (e.g. the X-axis). Equation 2 implies that any capacitor that varies with displacement along the X-axis will generate an appropriate force. An implementation of a pair of such capacitors is shown in FIG. 3. This capacitor configuration has a number of advantages including ample room for large displacements along the X-axis without collisions between comb fingers. By applying differential voltages with a common mode bias $V_{DC}$ across electrically conductive comb fingers 72a, 73a and 72b, 73b a force that is independent of X-axis displacement and linear with control voltage, $v_x$ is created.

$$V_1 = V_{DC} - v_x$$
$$V_2 = V_{DC} + v_x$$
$$F_x = \frac{1}{2}\frac{\partial C}{\partial x}V_2^2 - \frac{1}{2}\frac{\partial C}{\partial x}V_1^2 = 2\frac{C_0}{X_0}V_{DC}v_x$$

Equation 3 where $C_0$ and $X_0$ are the capacitance and X-axis air-gap at zero displacement respectively. An equivalent method of applying forces chooses $V_1$, $V_2$ such that:

$$V_1 = V_{DC} - v_x$$
$$V_2 = -V_{DC} - v_x$$

Equation 4

Note that in both of these cases the magnitude of the force is proportional to the control voltage, $v_x$, and the DC bias voltage, $V_{DC}$. This permits the magnitude and direction of the force to be directly controlled by varying either $v_x$ or $V_{DC}$ while maintaining the other voltage constant. Other prior-art work has used parallel-plate capacitors, or piezoelectric transduction elements to effect motion.

Many methods are known that sense motion or displacement using air-gap capacitors. Details of capacitive measurement techniques are well known by those skilled in the art. These methods may be used for detection of displacement due to Coriolis acceleration, measuring quadrature error (described below), or as part of an oscillation-sustaining loop. Often a changing voltage is applied to two nominally equal-sized capacitors, formed by a plurality of conductive fingers, with values that change in opposite directions in response to a displacement. For example, one method applies voltages to these sensing capacitors in a manner that generates a charge that is measured by a sense interface (see for example: Boser, B. E., Howe, R. T., "Surface micromachined accelerometers," IEEE Journal of Solid-State Circuits, vol. 31, pp. 366–75, March 1996., or Lemkin, M., Boser B. E., "A micromachined fully differential lateral accelerometer," CICC Dig. Tech. Papers, May 1996, pp. 315–318.). Another method uses a constant DC bias voltage applied across two sensing capacitors. Any change in the capacitance values results in current flow that is detected by a sense interface (See for example: Clark, W. A., Micromachined Vibratory Rate Gyroscopes, Doctoral Dissertation, University of California, 1997; Roessig, T. A., Integrated MEMS Tuning Fork Oscillators for Sensor Applications, University of California, 1998; Nguyen, C. T.-C., Howe, R. T., "An integrated CMOS micromechanical resonator high-Q oscillator," IEEE JSSC, pp. 440–455, April 1999). Furthermore, some methods of capacitive detection use time-multiplexing (See for example: M. Lemkin, B. E. Boser, "A three-axis micromachined accelerometer with a CMOS position-sense interface and digital offset-trim electronics," IEEE Journal of Solid-State Circuits, pp. 456–68, April 1999) or frequency multiplexing (See for example Sherman, S. J, et. al., "A low cost monolithic accelerometer; product/technology update," International Electron Devices Meeting, San Francisco, Calif., December 1992, pp. 501–4) to enable electrostatic forces to be applied to a microstructure and displacement or motion of the microstructure to be sensed using a single set of capacitors. An example of an application in which time- or frequency-multiplexing of capacitor function in such a manner may prove useful includes a force-feedback loop.

Provided with a controllable force applied to a structure and a measure of the structure's deflection, the structure may be driven into oscillation using feedback. Oscillation is achieved by measuring the structure's displacement or velocity then determining the magnitude, and/or phase of the force or forces to apply to the structure. The measurement of the structure's displacement and the force(s) applied may be electrostatic as described above. In a dual-mass gyroscope the position or velocity detected by the sense interface often reflects relative motion between the two masses, and the forces applied to the two masses may contain a differential force component. Many methods that sustain drive-mode oscillation are known by those skilled in the art. Descriptions of oscillation-sustaining circuits and techniques may be found in, for example (Roessig, T. A., Integrated MEMS Tuning Fork Oscillators for Sensor Applications, University of California, 1998; Nguyen, C. T.-C., Howe, R. T., "An integrated CMOS micromechanical resonator high-Q oscillator," IEEE JSSC, pp. 440–455, April 1999; Lemkin, et al. U.S. patent application Ser. No. 09/322,840 Filed May 28, 1999; Putty et al., U.S. Pat. No. 5,383,362, Issued Jan. 24, 1995; Ward, U.S. Pat. No. 5,600,064, Issued Feb. 4, 1997). Note that driven-mode oscillations may also be excited open loop, see for example Geiger, W. et al. "A mechanically controlled oscillator," *Transducers* 99, Sendai Japan, Jun. 7–10, 1999 pp. 1406–09.

Because of imperfections introduced in the manufacturing process, the gyroscope driven-mode and sense-axis may not be perfectly orthogonal. Imperfections in elements of the suspension are one possible source of this non-orthogonality. A non-orthogonal relationship between the driven-mode and the sense-axis may cause a sense capacitance change proportional to displacement in the drive-mode to appear along the sense axis. When the sense-capacitance change is detected using a position-sense interface, an output signal substantially in-phase with displacement may result.

This undesirable signal is termed quadrature error. Since Coriolis acceleration is in phase with velocity, these two signals are ideally separated by 90 degrees of phase, hence the name quadrature error. Note, however, the magnitude of the quadrature error may be many orders of magnitude greater than the quantity of interest: Coriolis acceleration.

Due to the similarity and relative magnitude of the two signals, quadrature-error can contaminate if not overwhelm the sensor output. For example, a small amount of phase lag in detection circuitry can lead to quadrature error leakage into the sensor output. Results of this leakage may include large sensor output offsets, output-offset drift, and noise. In addition, large quadrature-error signals may cause saturation of sense-mode interfaces. Quadrature-error has been addressed in different ways in prior art gyroscopes including forcing mechanisms (Ward, U.S. Pat. No. 5,600,064, Issued Feb. 4, 1997; Clark et al, U.S. Pat. No. 5,992,233, Issued Nov. 30, 1999; Clark et al., U.S. patent application Ser. No. 09/321,972, Filed May 28, 1999) and carefully-designed, well-controlled fabrication of mechanical structures (Geen, J. "A path to low cost gyroscopy," *IEEE Solid-State Sensor and Actuator Workshop*, Hilton Head Island, S.C., Jun. 8–11, 1998, pp 51–4.). A good description of sources of quadrature-error and the effect on vibratory-rate gyroscopes may be found in Clark, W. A., Micromachined Vibratory Rate Gyroscopes, Doctoral Dissertation, University of California, 1997.

SUMMARY OF THE INVENTION

It is an object of the present invention to provide a device for causing a vibrating mass to vibrate, absent a Coriolis force, more precisely along a driven axis substantially orthogonal to a sense axis. Since deflections along the sense axis may be sensed to infer a rotation rate in a vibratory-rate gyroscope, improved sensor output may be attained when the mass is caused to vibrate more precisely along a drive axis.

It is a further object of the present invention to provide a device capable of causing a vibrating mass to vibrate, absent a Coriolis force, more precisely along a driven axis using a feedback network in which quadrature-error is measured and actively fed back to cause the vibrating mass to vibrate, absent a Coriolis force, more precisely along a driven axis in the presence of disturbances such as temperature fluctuations, flicker noise, or variations in mechanical stress.

It is a further object of the present invention to provide a device capable of causing a vibrating mass to vibrate, absent a Coriolis force, more precisely along a driven axis in an area-efficient manner.

It is a further object of the present invention to provide a device capable of causing a vibrating mass to vibrate, absent a Coriolis force, more precisely along a driven axis where the vibrating mass is formed from a single layer of conductive material.

These and other objects are accomplished, according to an embodiment of the present invention, by a movable microstructure comprising a substrate, and a proof-mass disposed above the substrate. The movable microstructure includes a first finger set comprising two or more first fingers affixed to the substrate and extending substantially parallel to a defined displacement axis towards the proof-mass. The movable microstructure further includes a second finger set comprising at least one second finger, each member of the second finger set extending substantially parallel to the displacement axis from the proof-mass, terminating between two first fingers. Each second finger is substantially closer to one of the two first fingers between which it terminates. The first finger set, in conjunction with the second finger set, form two terminals of a capacitor. An electrical circuit is included that provides a voltage across the capacitor to generate a position-dependent force, the position-dependent force having a component along an axis substantially orthogonal to the displacement axis, the magnitude of the position-dependent force varying in proportion to displacement along the displacement axis.

BRIEF DESCRIPTION OF THE DRAWINGS

For a better understanding of the nature and objects of the invention, reference should be made to the following detailed description taken in conjunction with the accompanying drawings, in which:

FIG. 5A is a plan view of a second embodiment of the invention, showing a proof-mass having oscillatory behavior that may appear as quadrature error.

FIG. 5B is a plan view of a second embodiment of the invention, showing correction of undesired oscillatory behavior.

FIG. 6A is a plan view of a third embodiment of the invention, showing a proof-mass having oscillatory behavior that may appear as quadrature error.

FIG. 6B is a plan view of a third embodiment of the invention, showing correction of undesired oscillatory behavior.

FIG. 7A is a plan view of a fourth embodiment of the invention, showing a proof-mass having oscillatory behavior that may appear as quadrature error.

FIG. 7B is a plan view of a fourth embodiment of the invention, showing correction of undesired oscillatory behavior.

FIG. 8A is a plan view of a fifth embodiment of the invention, showing two proof-masses having oscillatory behavior that may appear as quadrature error.

FIG. 8B is a plan view of a fifth embodiment of the invention, showing correction of undesired oscillatory behavior.

FIG. 9A is a plan view of a sixth embodiment of the invention, showing two proof-masses having oscillatory behavior that may appear as quadrature error.

FIG. 9B is a plan view of a sixth embodiment of the invention, showing correction of undesired oscillatory behavior.

Like reference numerals refer to corresponding parts throughout all the views of the drawings.

DETAILED DESCRIPTION

A novel quadrature-nulling structure in accordance with the present invention reduces quadrature-error in single-mass vibratory-rate gyroscopes (VGR's), dual-mass VGR's, and single- or dual-mass frame-based VGR's. It will be well understood by those of average skill that the structure is to be used with an oscillation-sustaining loop and a sense axis position-sensing interface. As described in the section titled Description of the Related Art, these methods and configurations are well known by those skilled in the art. To prevent unnecessary distraction from the subject of the invention, air-gap capacitors comprising the oscillation-sustaining loop and the sense-axis position-sensing interface are not shown in the following detailed description of the invention.

Figure 1:
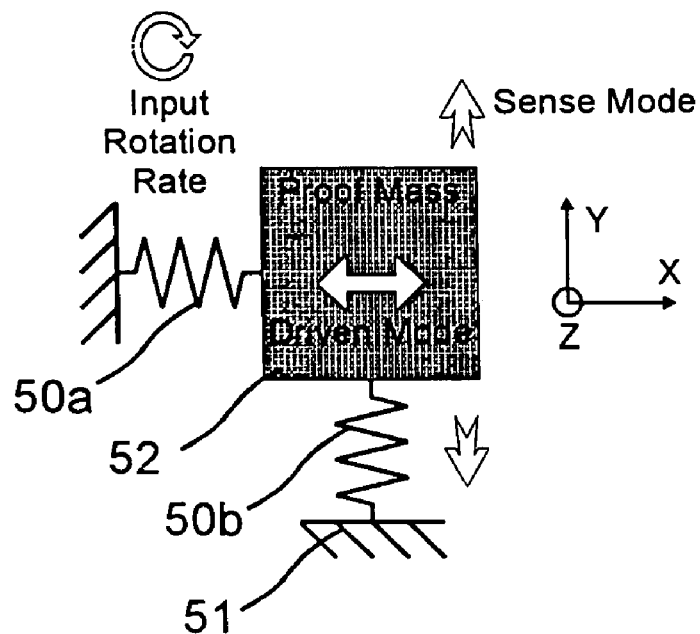
FIG. 1 is a schematic diagram of a proof-mass, connected to a substrate by a suspension.
Figure 2:
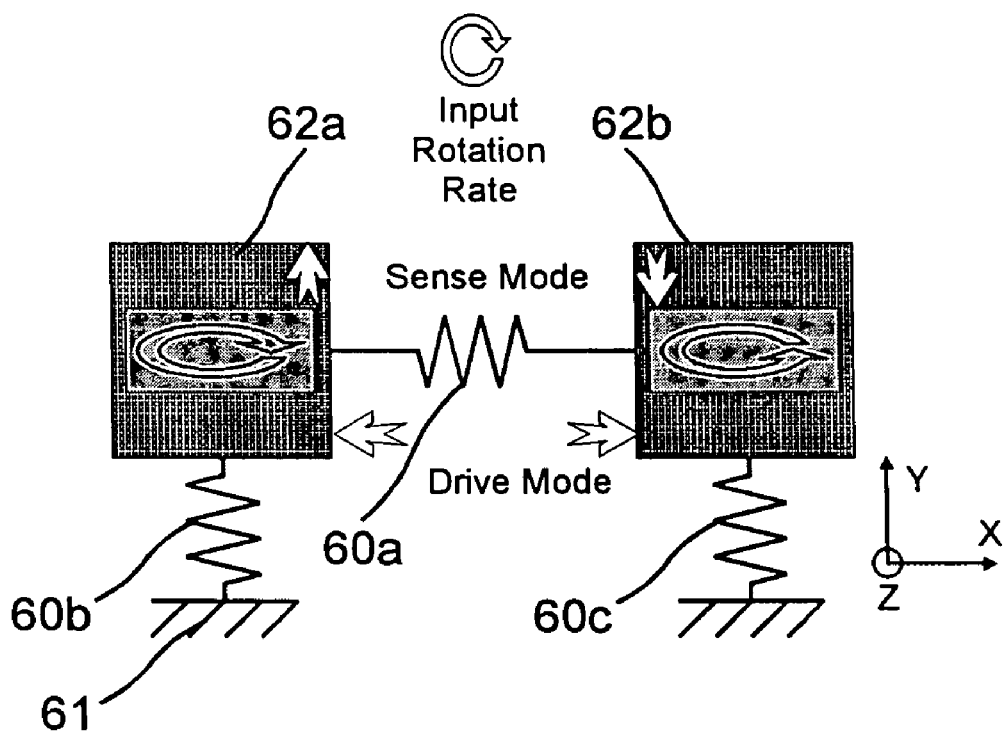
FIG. 2 is a simplified schematic diagram of a dual-mass gyroscope.
Figure 3:
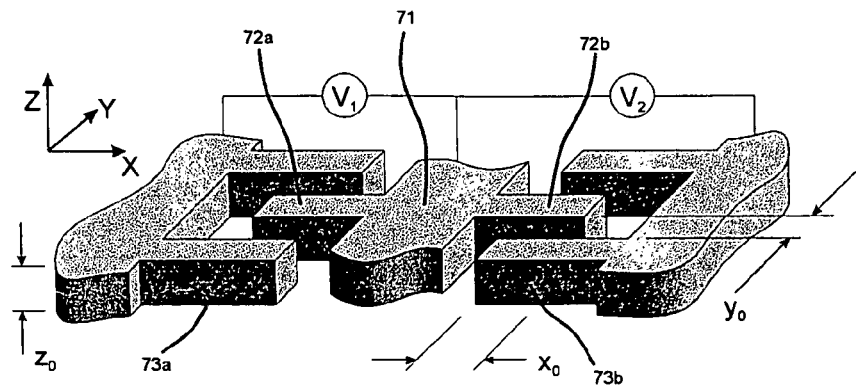
FIG. 3 is a perspective view of a capacitor that is convenient for sensing or forcing motion along a drive-axis.
Figure 4:
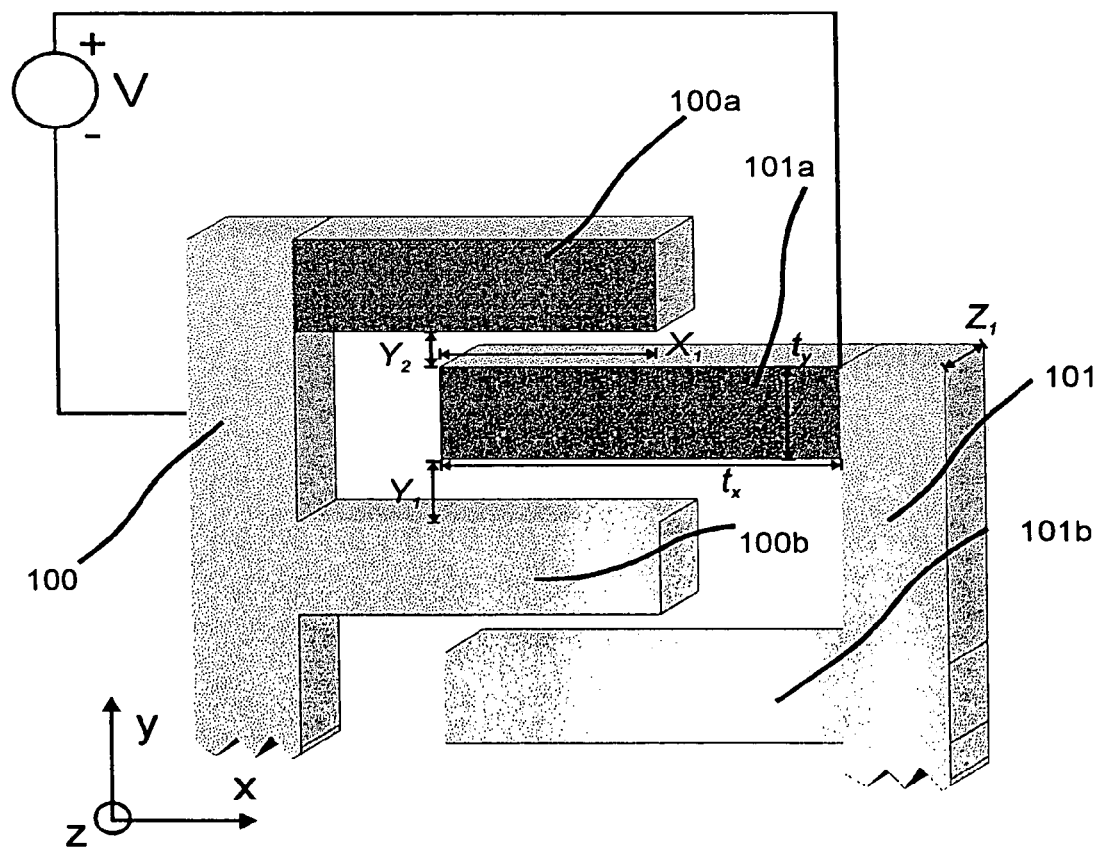
FIG. 4 is a perspective view of a first embodiment of the invention.

FIG. 4 shows a first embodiment of the present invention. In this embodiment, a quadrature-nulling structure includes at least one comb-finger set comprising one first comb-finger 100*a* located adjacent to one second comb finger 101*a*. Often a plurality of comb-finger sets will be required to attain sufficient quadrature-correction force to cancel quadrature-error. Note that multiple comb-finger sets are formed adjacent to each other as illustrated in FIG. 4 (i.e. second comb-finger set 100*b*, 101 *b* etc.). Like individual comb fingers 100*a*, 100*b*, etc. are electrically connected by connection element 100. Similarly, like individual comb fingers 101*a*, 101*b*, etc. are electrically connected by connection element 101. In this embodiment, comb-fingers 100*a*, 100*b*, 101*a*, 101*b*, and connection elements 100 and 101 are formed from a conductive material. To obtain a nonzero force for quadrature-error cancellation, the gaps separating comb finger sets must not equal the gap between comb-fingers within a single set, i.e. $Y_1$, the distance to the next set, should not equal $Y_2$. Typically, the ratio of these gaps differ by a factor of two or more in either direction, i.e. $Y_2 > 2Y_1$ or $Y_1 > 2Y_2$.

Note when multiple fingers are needed to provide sufficient quadrature-correcting force, like fingers may be connected to the same electrical node. Thus, like fingers (for example, 100a and 100b) may be formed in a single layer of conducting material. Finger(s) 100a (100b etc.) may be attached to a proof-mass and finger(s) 101a (101b etc.) may be attached to the substrate. Alternatively, finger(s) 100a (100b etc.) may be attached to the substrate and finger(s) 101a (101b etc.) may be attached to a proof-mass. A quadrature-nulling force, with Y-axis value having a component proportional to X-axis displacement, is generated by applying a voltage V between the two electrical nodes formed by like interconnected fingers. When multiple sets of cancellation fingers are required, the Y-axis force on a single finger 101a for a single finger pair located adjacent to another finger pair is approximately:

$$F_Y(x) = \frac{\varepsilon_0 Z_1 x}{2}\left(\frac{1}{Y_2^2} - \frac{1}{Y_1^2}\right)V^2 = \underbrace{\frac{\varepsilon_0 Z_1 X_1}{2}\left(\frac{1}{Y_2^2} - \frac{1}{Y_1^2}\right)V^2}_{StaticForce} - \underbrace{\frac{\varepsilon_0 Z_1 dx}{2}\left(\frac{1}{Y_2^2} - \frac{1}{Y_1^2}\right)V^2}_{ForceProportionaltoDisplacement}$$

Equation 5 where $X_1$, and $Z_1$ are the nominal overlap lengths of the quadrature-nulling structure in the X- and Z-directions, $\epsilon_0$ is the permittivity of free space, $Y_2$ is the nominal separation distance between comb-finger 100a and comb-finger 101a, $Y_1$ is the nominal separation distance between comb-finger 101a and comb-finger 100b (i.e. the next comb-finger set), and dx is the displacement of the end of comb-finger 101a from the nominal position along the X-direction—the overlap length along the X-direction at a given displacement dx being equal to $X_1$–dx. Typically the fingers comprise a conductive material, such as doped silicon or doped polysilicon, having a thickness $Z_1$ from about 2 microns to 100 microns, a width $t_y$ from about 1 to 25 microns, a finger length $t_x$ from about 2 to 50 microns, and an overlap length $X_1$ of more than 2 microns. The gap distance $Y_2$ is typically between 1 to 10 microns with $Y_1$ typically being 2 or more times $Y_2$. The actual dimensions of the quadrature-nulling structures will, of course, depend on the specifics of both the particular mechanical design as well as the particular technology in which the structures are formed. Examples of parameters that may affect the quadrature-nulling structure dimensions include: the amount of quadrature-nulling required by a particular mechanical design; the uniformity and sidewall angle of suspensions and beams used in the construction of a sense-element; minimum definable line or space set by photolithographic constraints (i.e. critical dimension); and residual stress gradient in a film into which a sense-element is formed.

From Equation 5 it is clear that if $Y_1$ is set equal to $Y_2$ then the resulting quadrature-correction force, the component of force proportional to displacement, is zero: $F_y$ is independent of displacement along the X-direction. When $Y_1$ is not equal to $Y_2$, $F_y$ is a function of relative X-axis displacement, and correspondingly appears as an off diagonal element when represented in spring matrix form. Since this spring-force may be adjusted by voltage V, it may be used to cancel off-axis spring terms due to, for instance, imperfections in the suspension. An important advantage of the present invention may now be noted. When the comb-finger capacitors comprise a conductive material, and the voltage across the comb-finger capacitor is provided by a low-impedance voltage source, such as the output of an operational amplifier connected in negative feedback, or a electrochemical battery, there is essentially zero phase error between proof-mass position along the drive-axis and the force $F_y$. An in-phase relationship between these two quantities enables effective cancellation of off-diagonal terms in the spring-matrix, thereby providing improved oscillation.

FIG. 5A illustrates a schematic diagram of a second embodiment of the invention. A single-mass gyroscope includes a quadrature-nulling structure comprising comb fingers 200a, 200b anchored to substrate 250 and proof-mass comb finger 201a, connected to proof-mass 210. Proof-mass 210 is suspended above substrate 250 by a suspension that may be decomposed into substantially orthogonal springs 221 and 222. This schematic diagram shows proof-mass motion with quadrature-error which is hereby denoted as positive, since the proof-mass moves along the positive Y-axis for proof-mass motion along the positive X-axis. The arrow on the proof-mass represents motion of the proof-mass under zero input rate: largely along the X-axis, or drive-axis, with a small component along the Y-axis or sense-axis. Y-axis motion is exaggerated to aid in the description of the invention. Application of a voltage between comb-fingers 201a and comb-finger 200a, 200b may be used to provide a X-axis dependent force to proof-mass 210 having a Y-axis component shown in Equation 5. This Y-axis force, directed in the positive Y-direction, may be adjusted to result in a zero dynamic Y-axis displacement during motion along the X-axis, as shown in FIG. 5B. Note that since electrostatic forces across a capacitor are attractive, this embodiment of the invention is unable to cancel negative quadrature-errors because the gap between finger 200a and 201a is smaller than the gap between 200b and 201a. Furthermore, note that while dynamic motion is attenuated, a static Y-axis displacement may remain. The presence of a static Y-axis displacement is typically of little consequence, however, since electrical outputs from position-sense circuitry due to static displacement is modulated to higher frequencies when Coriolis acceleration is demodulated.

Since it is often desirable to maintain symmetry in a mechanical sense-element, multiple quadrature-error cancellation structures may be utilized, as shown in a third and fourth embodiment of the invention shown in FIGS. 6 and 7 respectively. These embodiments have the ability to cancel both positive and negative quadrature-errors. Once again, for clarity, suspension elements, drive-capacitors and sense-capacitors are not shown.

In a third embodiment of the invention a single-mass gyroscope includes a quadrature-nulling structure comprising anchored comb fingers 300a,b and 302a,b; proof-mass comb fingers 301a and 303a; and proof-mass 310. FIG. 6A shows proof-mass motion with negative quadrature-error. The arrow on the proof-mass represents motion of the proof-mass under zero input rate: largely along the X-axis, or drive-axis, with a small component along the Y-axis or sense-axis. FIG. 6B shows that application of a voltage between comb-fingers 303a and comb-fingers 302a, 302b may be used to provide a X-axis dependent force to proof-mass 310 having a Y-axis component. This Y-axis force, directed along the positive Y-axis, may be adjusted to result in a zero dynamic Y-axis displacement during motion along the X-axis, as shown in FIG. 6B. Note that separate, independent voltages may be applied across both capacitors: the capacitor formed by fingers 300a, 300b and 301a, and the capacitor formed by fingers 302a, 302b and 303a. In this manner, voltages may be applied across both sets of capacitors to provide a biased operating point about which quadrature-error may be canceled. Operation about a biased operating point may be advantageous when quadrature error is very small, fluctuates between positive and negative, or a linear voltage to force relationship is desired.

While the third embodiment of the invention provides for cancellation of positive and negative quadrature-error, the lack of quadrature-error cancellation structures providing a net electrostatic attraction along the negative Y-axis may cause a static displacement along the Y-axis to occur when quadrature-error is canceled via application of voltage to the cancellation structures and under zero rate input. A fourth embodiment of the invention provides for cancellation of positive and negative quadrature-error, while enabling the static component of displacement along the Y-axis to be controlled.

In a fourth embodiment of the invention a single-mass gyroscope includes a balanced quadrature-nulling structure comprising anchored comb fingers 400a, 400b, 402a, 402b, 404a, 404b and 406a, 406b; proof-mass comb fingers 401a, 403a, 405a, and 407a; and proof-mass 410. FIG. 7A shows proof-mass motion with positive quadrature-error. The arrow on the proof-mass represents motion of the proof-mass under zero input rate: largely along the X-axis, or drive-axis, with a small component along the Y-axis or sense-axis. FIG. 7B shows that application of a voltage between comb-fingers 401a and comb-fingers 400a, 400b in conjunction with application of a voltage between comb-fingers 407a and comb-fingers 406a, 406b may be used to provide a X-axis dependent force to proof-mass 410. The Y-axis forces, may be adjusted to result in both a zero dynamic and a zero static Y-axis displacement during motion along the X-axis, as shown in FIG. 7B. Note that this embodiment also provides for the operation about a biased operating point, in which each of the four capacitors include a nonzero voltage component across them: the capacitor formed by fingers 400a, 400b and 401a, the capacitor formed by fingers 402a, 402b and 403a, the capacitor formed by fingers 404a, 404b and 405a, and the capacitor formed by fingers 406a, 406b and 407a.

In a fifth embodiment of the invention, shown in FIG. 8A, a dual-mass gyroscope includes a quadrature-nulling structure comprising anchored comb fingers 500a, 500b, 502a, 502b; proof-mass comb fingers 501a, 503a; and proof-masses 510a, 510b. In nominal operation, the proof-masses will be driven in an anti-phase manner along the X-axis. FIG. 8A shows differential proof-mass motion with quadrature-error which is hereby denoted as positive. The arrows on the proof-masses represent motion of the proof-masses under zero input rate: largely differential or anti-phase motion along the X-axis, or drive-axis, with a small differential component along the Y-axis or sense-axis. FIG. 8B shows that application of a voltage between comb-fingers 501a and comb-fingers 500a, 500b may be used to provide a X-axis dependent force to proof-mass 510. The Y-axis force may be adjusted to result in zero differential dynamic Y-axis displacement during motion along the X-axis, as shown in FIG. 8B. Note that this embodiment also provides for the operation about a biased operating point. While the fifth embodiment of the invention provides for cancellation of both positive and negative quadrature-error in a dual-mass gyroscope, the lack of quadrature-error cancellation structures providing a net electrostatic attraction along the negative Y-axis may cause a dynamic variation of common-mode displacement with a static differential component along the Y-axis to occur when quadrature-error is canceled via application of voltage to the cancellation structures and under zero rate input.

In a sixth embodiment of the invention, shown in FIG. 9A, a dual-mass gyroscope includes a quadrature-nulling structure comprising anchored comb fingers 600a, 600b, 602a, 602b, 604a, 604b, 606a, 606b; proof-mass comb fingers 601a, 603a, 605a, 607a; and proof-masses 610a,b. In nominal operation, the proof-masses will be driven in an anti-phase manner along the X-axis. FIG. 9A shows differential proof-mass motion with positive quadrature-error. The arrows on the proof-masses represent motion of the proof-masses under zero input rate: largely differential motion along the X-axis, or drive-axis, with a small differential component along the Y-axis or sense-axis. FIG. 9B shows that voltages may be chosen and applied across the four capacitors formed by the following capacitor pairs: (600a,b; 601a), (602a,b; 603a), (604a,b; 605a), (606a,b; 607a). The voltages may be used to provide X-axis dependent forces along the Y-axis to proof-masses 610a,b. The Y-axis force may be adjusted to result in zero dynamic differential Y-axis displacement and zero dynamic common-mode Y-axis displacement during motion along the X-axis, as shown in FIG. 9B. While dynamic common-mode Y-axis displacement may be attenuated, a static common-mode displacement with a static differential component may still remain.

In a seventh embodiment of the invention a dual-mass gyroscope includes a balanced quadrature-nulling structure for each proof-mass, the balanced quadrature-nulling structure being similar to the structure shown in FIG. 7A and FIG. 7B.

Note that in these embodiments of the invention, fingers anchored to the substrate of each independent quadrature-nulling structure may be driven to different electrical potentials. In most cases the fingers anchored to the proof-masses will have similar potential with respect to each other; however, this constraint is not necessary to practice the invention.

Figure 10:
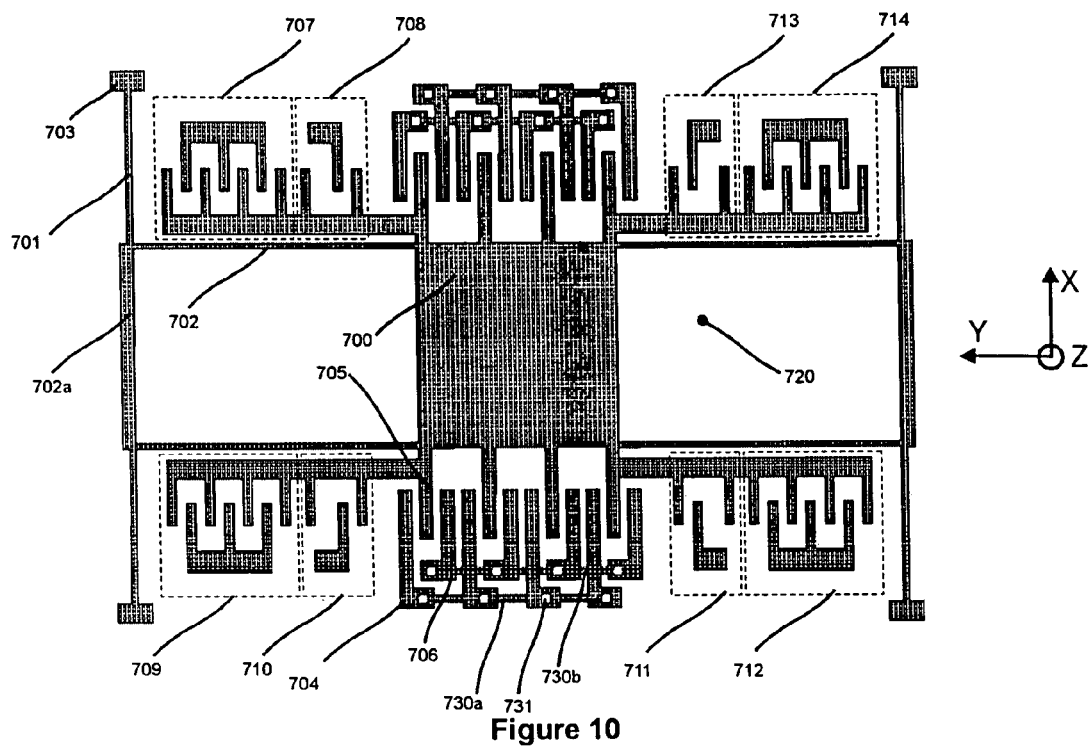
FIG. 10 is a plan view of a simplified sense-element with quadrature-correction structures.

FIG. 10 illustrates a simplified plan-view of a single-mass vibratory rate gyroscope including: a suspension anchored to substrate 720 via anchors 703; a suspension comprising flexures 701, 702, 702a and similar beams; quadrature-cancellation structures 708, 710, 711, and 713; drive-sense 707,714 and drive-force 709,712 interdigitated comb-drive capacitors for oscillating proof-mass 700 along the drive-axis using, for example, a transresistance amplifier (see for example Roessig, T. A., Integrated MEMS Tuning Fork Oscillators for Sensor Applications, University of California, 1998); and a capacitor bridge formed of fingers 704, 705, 706, and similar fingers connected by interconnection 730a,b and contacts 731. Note that finger 705 and similar connected fingers form the center terminal of the capacitor bridge. Imbalance in the capacitive bridge may be detected using any of a number of techniques well-known by those skilled in the art (see for example: Boser, B. E., Howe, R. T., "Surface micromachined accelerometers," IEEE Journal of Solid-State Circuits, vol. 31, pp. 366–75, March 1996; M. Lemkin, B. E. Boser, "A three-axis micromachined accelerometer with a CMOS position-sense interface and digital offset-trim electronics," IEEE Journal of Solid-State Circuits, pp. 456–68, April 1999; Sherman, S. J, et. al., "A low cost monolithic accelerometer; product/technology update," International Electron Devices Meeting, San Francisco, Calif., December 1992, pp. 501–4). The sense-element is typically formed in a conductive mechanical device layer, such as doped silicon.

Figure 11:
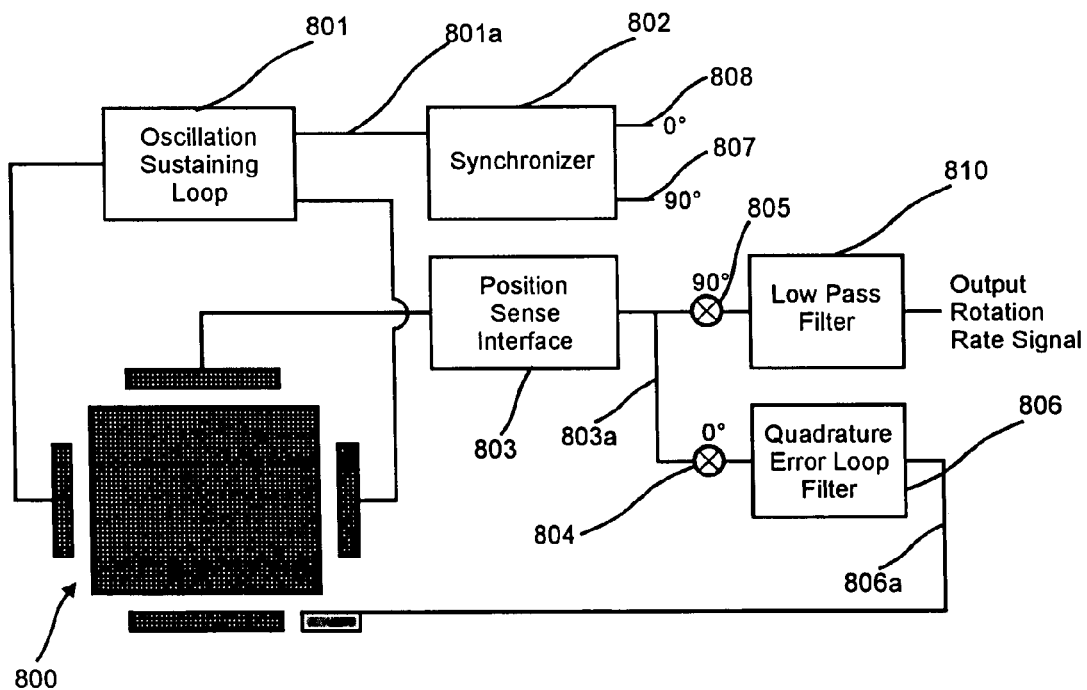
FIG. 11 is a schematic diagram of a vibratory-rate gyroscope including closed loop quadrature-error correction.

FIG. 11 illustrates a schematic diagram of a vibratory rate gyroscope with closed-loop quadrature-error cancellation. The feedback loop operates by measuring quadrature error and adjusting the bias voltages on the quadrature-error cancellation structures in accordance with a filtered representation of the quadrature error. This feedback loop is connected so that the measured quadrature error is driven towards zero. Sense-element 800 includes one or more proof-masses, one or more drive capacitors for providing an oscillation sustaining force along a drive-axis, one or more sense capacitors for detecting displacements of the proof-mass along a sense-axis, one or more suspensions, and a set of quadrature-error cancellation structures. A vibratory-rate gyroscope with closed-loop quadrature-error cancellation comprises sense-element 800; an oscillation sustaining feedback network 801 including a connection to drive capacitors, the oscillation sustaining feedback loop having an output 801a substantially in-phase with proof-mass position; synchronizer 802, having in-phase 808 and quadrature 807 outputs, which may be a phase-locked loop or comparator, synchronizer 802 providing synchronous demodulation signals for mixers 804 and 805; position-sense interface 803 including a connection to sense capacitors; mixer 804 to demodulate the quadrature-error portion of position-sense interface output 803a to a baseband signal; filter 806 for setting the bandwidth of the quadrature-error cancellation feedback loop; connection 806a from filter 806 to quadrature-error cancellation structures; mixer 805 to demodulate the Coriolis—signal portion of position-sense interface output 803a to a baseband signal; filter 810 for low-pass filtering the demodulated Coriolis signal thereby providing an electrical output representative of an input rotation rate, with suppressed quadrature-error. Since mixer 804 is synchronized with drive-axis position, mixer 804 serves as a quadrature detection circuit.

In an alternative embodiment, oscillation sustaining loop output 801a is substantially in phase with drive-mode velocity. In this case the demodulation signals provided to the two mixers are interchanged to correctly demodulate quadrature and Coriolis acceleration.

The schematic diagram of FIG. 11 includes circuit and signal processing elements represented as functional blocks. These functional blocks comprise well-known circuits and devices and are shown in block diagram form to avoid unnecessary distraction from the underlying invention. It is explicitly noted, however, that the functional blocks and feedback connections may operate in a continuous-time fashion, a sampled-data fashion, or a combination thereof.

Some prior-art active quadrature-error correction techniques require multiple electrical nodes closely-spaced adjacent to each other, resulting in increased parasitic capacitance, increased wiring complexity, and increased size. Depending on the technology in which the gyroscope and quadrature-nulling structures are formed, the present invention may be highly advantageous because only two electrical nodes are required for each independent quadrature-nulling structure, only one node being anchored to the substrate. Thus, interconnection between like comb-fingers of a quadrature-null ing structure is greatly simplified—especially when fingers are formed in a single-crystal-silicon fabrication technology such as described in (Clark, et al., U.S. patent application Ser. No. 09/322,381 filed May 28, 1999; Clark, et al., U.S. Provisional Patent Application 60/127,973 filed Apr. 6, 1999; Brosnihan, et al., U.S. patent application Ser. No. 08/874,568 filed Jun. 13, 1997; Diem, et al., U.S. Pat. No. 5,495,761 issued May 5, 1996; Offenberg, et al., U.S. Pat. No. 5,627,317 issued May 6, 1997; Shaw, et al., U.S. Pat. No. 5,719,073 issued Feb. 17, 1998). Simple interconnection may translate to significantly reduced pitch between adjacent quadrature-nulling finger-pairs thereby reducing sensor area. Furthermore, parasitic capacitance between adjacent sets of comb fingers may be reduced, as compared to prior-art quadrature-error cancellation structures (see for example Clark, et al., U.S. Pat. No. 5,992,233 issued Nov. 30, 1999; Clark, et al., U.S. patent application Ser. No. 09/321,972 files May 28, 1999) leading to improved electrical characteristics when the quadrature-error cancellation structures are included in a feedback loop that measures the quadrature error and adjusts bias voltages accordingly. Furthermore, parasitic capacitance can slow settling and stability of voltages applied across quadrature-cancellation structures, thereby introducing a phase error between proof-mass position along the drive-axis and the force $F_y$.

The invention has been described as being especially advantageous when the structures are formed in a single-crystal-silicon fabrication technology. However, it is not necessary to form structures in a single-crystal silicon technology to practice the invention. The invention may be co-fabricated with integrated circuitry on a single chip using many fabrication methods including, but not limited to: surface micromachining, reactive ion etching, SOI-based micromachining, epi-polysilicon micromachining, or similar fabrication methods ortechnologies. Examples of some applicable fabrication technologies may be found in, for example: U.S. Provisional Patent Application Ser. No. 60/127,973, filed Apr. 6, 1999; U.S. patent application Ser. No. 09/322,381, filed May 28, 1999; and US patents: Tsang, et al., U.S. Pat. No. 5,326,726, issued Jul. 5, 1994; Spangler, et al., U.S. Pat. No. 5,343,064, issued Aug. 30, 1994; Bashir, et al., U.S. Pat. No. 5,747,353, issued May 5, 1998; Montague, et al., U.S. Pat. No. 5,798,283, issued Aug. 25, 1998; Zhang, et al., U.S. Pat. No. 5,506,175 issued Apr. 9, 1996; Kung, U.S. Pat. No. 5,504,026, issued Apr. 2, 1996.

Alternatively, different components comprising the invention may be formed as discrete elements. For example, the sense element may be formed on a silicon or quartz substrate and the interface, control and signal processing circuitry may be formed on one or more separate substrates as described in, for example: U.S. patents: MacDonald, et al., U.S. Pat. No. 5,198,390, issued Mar. 30, 1993; Diem, et al., U.S. Pat. No. 5,576,250, issued Nov. 19, 1996; Field, et al., U.S. Pat. No. 5,882,532, issued Mar. 16, 1999; Smith, T. et. al., "A 15b Electromechanical Sigma-Delta Converter for Acceleration Measurements," ISSCC Dig. Tech. Papers, pp. 160–161, 1994. Alternatively, the sense-element may be bulk-micromachined by any of a number of well-known methods, interface, control and signal processing circuitry may be formed on one or more separate substrates, and the electrical and mechanical substrates may be connected by one or more wire bonds.

The foregoing description, for the purposes of explanation, used specific nomenclature to provide a thorough understanding of the invention. However, it will be apparent to one skilled in the art that the specific details are not required in order to practice the invention. Thus, the foregoing descriptions of specific embodiments of the invention are presented for the purposes of illustration and description. They are not intended to be exhaustive or to limit the invention to the precise forms disclosed, obviously many modifications and variations are possible in view of the above teachings. For example, the invention may be used to obtain improved performance in single-mass frame-based or dual-mass frame-based gyroscopes, such as those described in (Geen, J., "A path to low cost gyroscopy," IEEE Solid-State Sensor and Actuator Workshop, Hilton Head Island, S.C., Jun. 8–11, 1998, pp 51–4; Schumacher, K. et al., "Micromechanical Liga-Gyroscope", Transducers 99, June 7–10 Sendai Japan, pp 1574–1577.), by providing improved drive-axis oscillation. The quadrature-error cancellation structures may also be used to adjust a compliant mode in a non-vibrating microstructure, such as an accelerometer, so that the compliant mode more accurately aligns with a predetermined direction—providing improved package alignment, for example. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A movable microstructure comprising:
   a first finger set comprising two or more first fingers extending substantially parallel to a first displacement axis;
   a second finger set comprising at least one second finger, said at least one second finger extending substantially parallel to said first displacement axis, terminating between and having a least a portion neighboring each of said two first fingers, wherein said portion of said at least one second finger is substantially closer to one of the two first fingers between which said at least one second finger terminates, thereby forming a capacitor; and
   an electrical circuit providing a position-dependent electrostatic force having a magnitude varying in proportion to relative displacement of said at least one second finger to the two first fingers along said first displacement axis.

2. The movable microstructure of claim 1 wherein said two or more first fingers comprise a conductive material, having a thickness between 2 and 100 microns, a width between 1 and 25 microns, a finger length between 2 to 50 microns, and an overlap length of more than 2 microns.

3. The movable microstructure of claim 2 wherein said one or more second fingers comprises a conductive material, having a thickness between 2 and 100 microns, a width between 1 and 25 microns, a finger length between 2 to 50 microns, and an overlap length of more than 2 microns.

4. A movable microstructure comprising:
   a substrate;
   a proof-mass disposed above said substrate;
   a first finger set comprising two or more first fingers extending substantially parallel to a first displacement axis from said proof-mass;
   a second finger set comprising at least one second finger, said at least one second finger is affixed to said substrate and extending substantially parallel to said first displacement axis towards said proof-mass, terminating between and having a least a portion neighboring each of said two first fingers, wherein said portion of said at least one second finger is closer to one of the two first fingers between which said at least one second finger terminates, thereby forming a capacitor; and
   an electrical circuit providing a voltage across said capacitor to provide a position-dependent electrostatic force on said proof-mass, said position-dependent force having a component along an axis substantially orthogonal to said first displacement axis, the magnitude of said position-dependent force varying in proportion to relative displacement of said at least one second finger to the two first fingers along said first displacement axis.

5. The movable microstructure of claim 4 further including an oscillation-sustaining feedback loop having an output representative of proof-mass displacement along said first displacement axis, said oscillation-sustaining feedback loop using electrostatic forces to sustain oscillatory motion.

6. The movable microstructure of claim 5 further including:
   a capacitive bridge responsive to displacements of said proof-mass along an axis orthogonal to said first displacement axis; and
   a position sense interface connected to said capacitive bridge, said position sense interface having an electrical output varying in response to changes in said capacitive bridge.

7. The movable microstructure of claim 5 wherein the voltage applied to said first capacitor is substantially constant and chosen to cause said proof mass, absent a Coriolis force, to vibrate more precisely along said first axis.

8. The movable microstructure of claim 6 further including:
   a quadrature detection circuit having an output, said quadrature detection circuit synchronized with the output of said oscillation-sustaining feedback loop; and
   a feedback connection from the output of said quadrature detection circuit to said first capacitor, said feedback connection providing a voltage across said first capacitor;
   wherein said voltage provided by said feedback connection causes the average output of said quadrature detection circuit to converge towards a constant value, thereby causing said mass to vibrate, absent a Coriolis force, more precisely along said first axis.

9. The movable microstructure of claim 5 further including:
   a third finger set comprising two or more third fingers affixed to said substrate and extending substantially parallel to said first displacement axis towards said proof-mass; and
   a fourth finger set comprising at least one fourth finger, said at least one fourth finger extending substantially parallel to said first displacement axis from said proof-mass along a direction opposite the direction of extension of said second fingers, terminating between said two third fingers, wherein said at least one fourth finger is closer to one of the two third fingers between which said at least one fourth finger terminates, thereby forming a second capacitor.

10. The moveable microstructure of claim 9 wherein said electrical circuit provides a second voltage across said second capacitor to provide a position-dependent force on said proof-mass, said position-dependent force having a component along an axis substantially orthogonal to said first displacement axis, the magnitude of said position-dependent force varying in proportion to displacement along said first displacement axis.

11. The movable microstructure of claim 9 further including:
    a capacitive bridge responsive to displacements of said proof-mass along a sense axis orthogonal to said first displacement axis;

a position sense interface connected to said capacitive bridge, said position sense interface having an electrical output varying in response to changes in said capacitive bridge;

a quadrature detection circuit having an output, said quadrature detection circuit synchronized with the output of said oscillation-sustaining feedback loop;

a feedback connection from the output of said quadrature detection circuit to said first and second capacitors, said feedback connection providing a defined voltage across each of said first and second capacitors, said voltage causing the average output of said quadrature detection circuit to converge towards a constant value, thereby causing said mass to vibrate, absent a Coriolis force, more precisely along said first axis; and a Coriolis detection circuit having an output, said Coriolis detection circuit synchronized with the output of said oscillation-sustaining feedback loop;

wherein the Coriolis detection circuit output provides an electrical signal representative of rotational motion about an axis largely orthogonal to both a sense axis and said first displacement axis.

12. A movable microstructure comprising:

a substrate;

a first proof-mass disposed above said substrate;

a second proof-mass disposed above said substrate;

a first finger set comprising two or more first fingers affixed to said substrate and extending substantially parallel to a first displacement axis towards said first proof-mass;

a second finger set comprising at least one second finger, said at least one second finger extending substantially parallel to said first displacement axis from said first proof-mass, terminating between and having a least a portion neighboring each of said two first fingers, wherein said portion of said at least one second finger is closer to one of the two first fingers between which said at least one second finger terminates, thereby forming a first capacitor;

a third finger set comprising two or more third fingers affixed to said substrate and extending in a direction opposite said first finger set and substantially parallel to said first displacement axis towards said second proof-mass;

a fourth finger set comprising at least one fourth finger, said at least one fourth finger extending substantially parallel to said first displacement axis from said second proof-mass, along a direction opposite said second fingers, terminating between and having a least a portion neighboring each of said two third fingers, wherein said portion of said at least one fourth finger is closer to one of the two third fingers between which said at least one fourth finger terminates, thereby forming a second capacitor; and an electrical circuit providing a first voltage across said first capacitor, and a second voltage across said second capacitor to provide position-dependent electrostatic forces on said first proof-mass and on said second proof-mass, said position-dependent forces having a component along an axis substantially orthogonal to said first displacement axis, the magnitude of said position-dependent force varying in proportion to proof-mass displacement and relative displacement of said at least one second finger to the first finger set, and third finger set to the fourth finger, along said first displacement axis.

13. The movable microstructure of claim 12 further including an oscillation-sustaining feedback loop having an output representative of the relative displacement between said first proof-mass and said second proof-mass along said first displacement axis, said oscillation-sustaining feedback loop using electrostatic forces to sustain oscillatory motion.

14. The movable microstructure of claim 13 further including:

a capacitive bridge responsive to the relative displacement between said first proof-mass and said second proof-mass along an axis orthogonal to said first displacement axis; and a position sense interface connected to said capacitive bridge, said position sense interface having an electrical output varying in response to changes in said capacitive bridge.

15. The movable microstructure of claim 13 wherein said first voltage and said second voltage are distinct, are substantially constant, and are chosen to cause said each said proof mass, absent a Coriolis force, to vibrate more precisely along said first axis.

16. The movable microstructure of claim 14 further including:

a quadrature detection circuit having an output, said quadrature detection circuit synchronized with the output of said oscillation-sustaining feedback loop; and a feedback connection from the output of said quadrature detection circuit to said first capacitor and said second capacitor, said feedback connection providing said first voltage and said second voltage;

wherein said first voltage and said second voltage cause the average output of said quadrature detection circuit to converge towards a constant value, thereby causing each said proof mass to vibrate, absent a Coriolis force, more precisely along said first axis.

17. The movable microstructure of claim 13 further including:

a fifth finger set comprising two or more fifth fingers affixed to said substrate and extending substantially parallel to a first displacement axis towards said first proof-mass in the direction of said first fingers;

a sixth finger set comprising at least one sixth finger, said at least one sixth finger extending substantially parallel to said first displacement axis from said first proof-mass along the direction of extension of said second fingers, terminating between said two fifth fingers, wherein said at least one sixth finger is substantially closer to the fifth finger opposite in direction of said first smaller gap in relation to said at least one second finger, thereby forming a third capacitor;

a seventh finger set comprising two or more seventh fingers affixed to said substrate and extending substantially parallel to a first displacement axis and towards said second proof-mass;

an eighth finger set comprising at least one eighth finger, said at least one eighth finger extending substantially parallel to said first displacement axis from said second proof-mass opposite the direction of the second fingers, terminating between said two seventh fingers, wherein said at least one eighth finger is substantially closer to the seventh finger opposite in direction of said second smaller gap in relation to said at least one fourth finger, thereby forming a fourth capacitor; and an electrical circuit providing a third voltage across said third capacitor, and a fourth voltage across said fourth capacitor to provide position-dependent forces on said first proof-mass and on said second proof-mass, said position-dependent forces having a component along an axis substantially orthogonal to said first displacement axis, the magnitude of said position-dependent force varying in proportion to proof-mass displacement along said first displacement axis.

18. The movable microstructure of claim 17 further including:
- a capacitive bridge responsive to the relative displacement between said first proof-mass and said second proof-mass along an axis orthogonal to said first displacement axis;
- a position sense interface connected to said capacitive bridge, said position sense interface having an electrical output varying in response to changes in said capacitive bridge;
- a quadrature detection circuit having an output, said quadrature detection circuit synchronized with the output of said oscillation-sustaining feedback loop;
- a feedback connection from the output of said quadrature detection circuit to said first capacitor, said second capacitor, said third capacitor and said fourth capacitor, said feedback connection providing said first voltage, said second voltage, said third voltage and said fourth voltage; and
- a Coriolis detection circuit having an electrical signal output representative of rotational motion about an axis largely orthogonal to both a sense axis and said first displacement axis, said Coriolis detection circuit synchronized with the output of said oscillation-sustaining feedback loop.

19. A micromachined vibratory rate gyroscope comprising:
- a substrate;
- a proof-mass disposed above said substrate;
- a first finger set comprising two or more first fingers affixed to said substrate and extending substantially parallel to a first displacement axis towards said proof-mass;
- a second finger set comprising at least one second finger, said at least one second finger extending substantially parallel to said first displacement axis from said proof-mass, terminating between and having a least a portion neighboring each of said two first fingers, wherein each said portion of said second finger is substantially closer to one of the two first fingers between which said at least one second finger terminates, thereby forming a capacitor with each of the first two fingers;
- an oscillation-sustaining feedback loop having an output representative of proof-mass displacement along said first displacement axis;
- a capacitive bridge responsive to displacements of said proof-mass along an axis orthogonal to said first displacement axis;
- a position sense interface connected to said capacitive bridge, said position sense interface having an electrical output varying in response to changes in said capacitive bridge;
- a quadrature detection circuit having an output, said quadrature detection circuit synchronized with the output of said oscillation-sustaining feedback loop; and
- a feedback connection from the output of said quadrature detection circuit to said first capacitor, said feedback connection providing a voltage across said first capacitor;
- wherein the voltage applied to said capacitor drives the output of said quadrature detection circuit towards a constant value, thereby causing said mass to vibrate absent a Coriolis force, more precisely along said first axis.

20. The movable microstructure of claim 1 wherein said portion of said at least one second finger is separated from said one of the two first fingers by a first distance and separated from another of the two first fingers by a second distance, the first distance being at least two times greater than the first distance.

* * * * *